(12) United States Patent
Christopulos et al.

(10) Patent No.: US 11,922,511 B2
(45) Date of Patent: *Mar. 5, 2024

(54) ASSIGNING MOBILE DEVICE DATA TO A VEHICLE

(71) Applicant: STATE FARM MUTUAL AUTOMOBILE INSURANCE COMPANY, Bloomington, IL (US)

(72) Inventors: Nicholas U. Christopulos, Bloomington, IL (US); Nicholas R. Baker, Normal, IL (US); Eric Bellas, Bloomington, IL (US); Benjamin F. Bowne, Mackinaw, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/504,183

(22) Filed: Oct. 18, 2021

(65) Prior Publication Data

US 2022/0036476 A1    Feb. 3, 2022

Related U.S. Application Data

(63) Continuation of application No. 14/096,709, filed on Dec. 4, 2013, now Pat. No. 11,182,859.

(51) Int. Cl.
*G06Q 40/08* (2012.01)
*G06Q 30/0201* (2023.01)
(Continued)

(52) U.S. Cl.
CPC ......... *G06Q 40/08* (2013.01); *G06Q 30/0201* (2013.01); *G01C 21/3484* (2013.01); *G01C 21/3617* (2013.01); *G01C 21/3697* (2013.01)

(58) Field of Classification Search
CPC .......................... G06Q 40/08; G06Q 30/0201
See application file for complete search history.

(56) References Cited

U.S. PATENT DOCUMENTS 6,098,048 A    8/2000  Dashefsky et al.
6,832,140 B2  12/2004  Fan et al.
(Continued)

FOREIGN PATENT DOCUMENTS

CA          2861007 A1      7/2013

OTHER PUBLICATIONS

"Experimenting with Google Play Services—Activity Recognition", http://blog.carmesh.eu/2013/05/31/experimenting-with-google-play-services-activity-recognition, retrieved from the internet on Nov. 7, 2013, 2 pages.
Activity Recognition, 818 G "Information—Centric Design of Context-Aware Systems", Feb. 19, 2013, 55 pages.
(Continued)

*Primary Examiner* — Renae Feacher
(74) *Attorney, Agent, or Firm* — MARSHALL, GERSTEIN & BORUN LLP

(57) ABSTRACT

A method for identifying a primary vehicle associated with a user of a mobile device includes receiving an indication of a vehicle entry event from a mobile device and retrieving sensor data from the mobile device. The method further includes receiving an indication of a vehicle exit event from the mobile device, generating a trip log including portions of the sensor data, and storing the trip log in a trip database. A server, or other suitable computing device, then analyzes the trip log and a plurality of previously stored trip logs in the trip database to determine a primary vehicle corresponding to the user of the mobile device. The method may allow a computing device to assign gathered mobile device data to a specific household vehicle.

20 Claims, 3 Drawing Sheets

(51) Int. Cl.
    *G01C 21/34*    (2006.01)
    *G01C 21/36*    (2006.01)

(56) References Cited

U.S. PATENT DOCUMENTS

| | | | |
|---|---|---|---|
| 7,715,961 B1* | 5/2010 | Kargupta | G06Q 10/08 |
| | | | 701/33.2 |
| 9,141,582 B1 | 9/2015 | Brinkmann et al. | |
| 2005/0137757 A1 | 6/2005 | Phelan et al. | |
| 2006/0068840 A1 | 3/2006 | Sherman | |
| 2008/0294690 A1* | 11/2008 | McClellan | G08G 1/09675 |
| 2008/0319602 A1 | 12/2008 | McClellan et al. | |
| 2009/0024273 A1 | 1/2009 | Follmer et al. | |
| 2009/0040054 A1 | 2/2009 | Wang et al. | |
| 2010/0030582 A1 | 2/2010 | Rippel et al. | |
| 2010/0063850 A1* | 3/2010 | Daniel | G06Q 40/08 |
| | | | 705/4 |
| 2010/0131304 A1 | 5/2010 | Collopy et al. | |
| 2010/0211304 A1 | 8/2010 | Hwang et al. | |
| 2010/0228604 A1 | 9/2010 | Desai et al. | |
| 2011/0238289 A1* | 9/2011 | Lehmann | G01C 21/3617 |
| | | | 701/533 |
| 2011/0258044 A1 | 10/2011 | Kargupta | |
| 2011/0281564 A1* | 11/2011 | Armitage | G07C 5/085 |
| | | | 455/414.1 |
| 2012/0078497 A1 | 3/2012 | Burke, Jr. | |
| 2012/0197484 A1 | 8/2012 | Nath et al. | |
| 2013/0041521 A1* | 2/2013 | Basir | B60R 25/33 |
| | | | 701/1 |
| 2013/0154819 A1 | 6/2013 | Stefanovski et al. | |
| 2013/0166098 A1 | 6/2013 | Lavie et al. | |
| 2013/0245986 A1* | 9/2013 | Grokop | G01P 13/00 |
| | | | 702/141 |
| 2013/0262067 A1 | 10/2013 | Zhang et al. | |
| 2013/0274955 A1* | 10/2013 | Rosenbaum | G07C 5/0808 |
| | | | 701/1 |
| 2014/0213234 A1* | 7/2014 | Inselberg | H04W 4/14 |
| | | | 455/418 |
| 2014/0335902 A1 | 11/2014 | Guba et al. | |

OTHER PUBLICATIONS

Brush et al., "Activity Recognition Research: The Good, the Bad, and the Future", Submission to Pervasive 2010 Workshop: How to do Good Research in Activity Recognition, 3 pages.
Chu, "In-Vehicle Driver Detection Using Mobile Phone Sensors", Submitted for Graduation with Departmental Distinction in Electrical and Computer Engineering, Apr. 20, 2011, 21 pages.
Dernbach, "Simple and Complex Activity Recognition Through Smart Phones", Eighth International Conference on Intelligent Environments, Jun. 26-29, 2012, Guanajuato, Mexico, 8 pages.
http://www.moves-app.com/faq, retrieved from the internet on Nov. 7, 2013, 3 pages.
Kose et al., "Online Human Activity Recognition on Smart Phones", 2nd International Workshop on Mobile Sensing, Apr. 16, 2012, Beijing, China, 5 pages.
Kwapisz et al., "Activity Recognition Using Cell Phone Accelerometers", SensorKDD'10, Jul. 25, 2010, Washington, DC, 9 pages.
Lu et al., "The Jigsaw Continuous Sensing Engine for Mobile Phone Applications", SenSys'10, Nov. 3-5, 2010, Zurich Switzerland, 14 pages.
Manzoni et al., "Transportation Mode Identification and Real-Time CO2 Emission Estimation Using Smartphones", Technical Report, Massachusetts Institute of Technology, Cambridge 2010, 12 pages.
Shen, "In-Vehicle Driver Detection Using Mobile Phone Sensors", Submitted for Graduation with Departmental Distinction in Electrical and Computer Engineering, Accepted for ACM MobiSys Jun. 2011 Poster, 17 pages.
Weiss et al., "Identifying User Traits by Mining Smart Phone Accelerometer Data", SensorKDD'11, Aug. 21, 2011, San Diego, CA, 9 pages.
Yan et al., Energy-Efficient Continuous Activity Recognition on Mobile Phones: An Activity-Adaptive Approach, 16th International Symposium on Wearable Computers (ISWC), Jun. 18-22, 2012, 8 pages.
Yang et al., "Detecting Driver Phone Use Leveraging Car Speakers", MobiCom'11, Sep. 19-23, 2011, Las Vegas, Nevada, 12 pages.
Zheng, "Predicting Activity Type from Accelerometer Data", An Abstract of the Thesis of Yonglei Zheng for the degree of Master of Science in Computer Science Presented on Aug. 17, 2012, 47 pages.

* cited by examiner

ASSIGNING MOBILE DEVICE DATA TO A VEHICLE

CROSS-REFERENCE TO RELATED APPLICATIONS

This application is a continuation of U.S. patent application Ser. No. 14/096,709, entitled "Assigning Mobile Device Data to a Vehicle," filed Dec. 4, 2013, the disclosure of which is incorporated by reference herein in its entirety.

TECHNICAL FIELD

The present disclosure generally relates to determining a vehicle corresponding to a user of a mobile device, and, more particularly, to a method for gathering and analyzing sensor data to determine the vehicle.

BACKGROUND

A common automotive insurance practice is to rate vehicles with primary, secondary, etc. drivers to develop an appropriate insurance rate for a vehicle. To this end, insurance agents collect driver information from customers and determine levels of risk associated with the drivers of the vehicle. For example, a car with a teenage driver as the primary driver and an older, experienced driver as a secondary driver may be more expensive to insure than a similar car with the older, experienced driver as the primary driver. Although such ratings systems aim to provide appropriate rates, information provided by insurance customers often does not accurately identify who is driving the vehicle at specific times, or how often certain drivers drive certain vehicles.

To more accurately access risk associated with particular drivers, data about vehicle operation (e.g., acceleration or velocity data) can be gathered from mobile devices, such as smartphones, and other onboard vehicle devices (e.g., global positioning system (GPS) receivers). Tying such data to a specific vehicle, however, is often challenging. Some current methods utilize Bluetooth connections to associate certain devices with certain vehicles. Many vehicles do not have original equipment manufacturer (OEM) Bluetooth or other wireless connectivity. As a result, separate devices commonly need to be installed in the vehicle, requiring additional expense on the part of an insurer or customer. Further, such device installation can also present challenging distribution issues.

SUMMARY

In one embodiment, a computer-implemented method comprises receiving, via a network interface, an indication of a vehicle entry event from a mobile device, wherein the vehicle entry event corresponds to a user of the mobile device entering a vehicle at a first point in time, and retrieving, with one or more computer processors and the network interface, sensor data from the mobile device. The method further includes receiving, via the network interface, an indication of a vehicle exit event from the mobile device, wherein the vehicle exit event corresponds to the user exiting the vehicle at a second point in time, generating, with the one or more computer processors, a trip log including portions of the sensor data generated by the mobile device at times between the first point in time and the second point in time, and storing, with the one or more computer processors, the trip log in a trip database. Still further, the method includes analyzing, with the one or more computer processors, the trip log and a plurality of previously stored trip logs in the trip database to determine a primary vehicle corresponding to the user of the mobile device.

In another embodiment, a computer device comprises one or more processors and one or more memories coupled to the one or more processors. The one or more memories include computer executable instructions stored therein that, when executed by the one or more processors, cause the one or more processors to: receive, via a network interface, an indication of a vehicle entry event from a mobile device, wherein the vehicle entry event corresponds to a user of the mobile device entering a vehicle at a first point in time, retrieve, with the network interface, sensor data from the mobile device, and receive, via the network interface, an indication of a vehicle exit event from the mobile device, wherein the vehicle exit event corresponds to the user exiting the vehicle at a second point in time. Further, the computer executable instructions cause the one or more processors to generate a trip log including portions of the sensor data generated by the mobile device at times between the first point in time and the second point in time, store the trip log in a trip database, and analyze the trip log and a plurality of previously stored trip logs in the trip database to determine a primary vehicle corresponding to the user of the mobile device.

In still another embodiment, a computer readable storage medium comprises non-transitory computer readable instructions stored thereon, the instructions, when executed on one or more processors, cause the one or more processors to: receive, via a network interface, an indication of a vehicle entry event from a mobile device, wherein the vehicle entry event corresponds to a user of the mobile device entering a vehicle at a first point in time and retrieve, with the network interface, sensor data from the mobile device. Further the computer readable instructions cause the one or more processors to receive, via the network interface, an indication of a vehicle exit event from the mobile device, wherein the vehicle exit event corresponds to the user exiting the vehicle at a second point in time, generate a trip log including portions of the sensor data generated by the mobile device at times between the first point in time and the second point in time, and store the trip log in a trip database. Still further, the computer readable instructions cause the one or more processors to analyze the trip log and a plurality of previously stored trip logs in the trip database to determine a primary vehicle corresponding to the user of the mobile device.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such terms should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The term "vehicle" may refer to any of a number of powered transportation devices. A vehicle may be a car, truck, bus, train, boat, plane, etc. Additionally, as used herein, the term "driver" may refer to any operator of a vehicle. A driver may be a car driver, truck driver, bus driver, train engineer, captain of a boat, pilot of a plane, etc.

Figure 1:
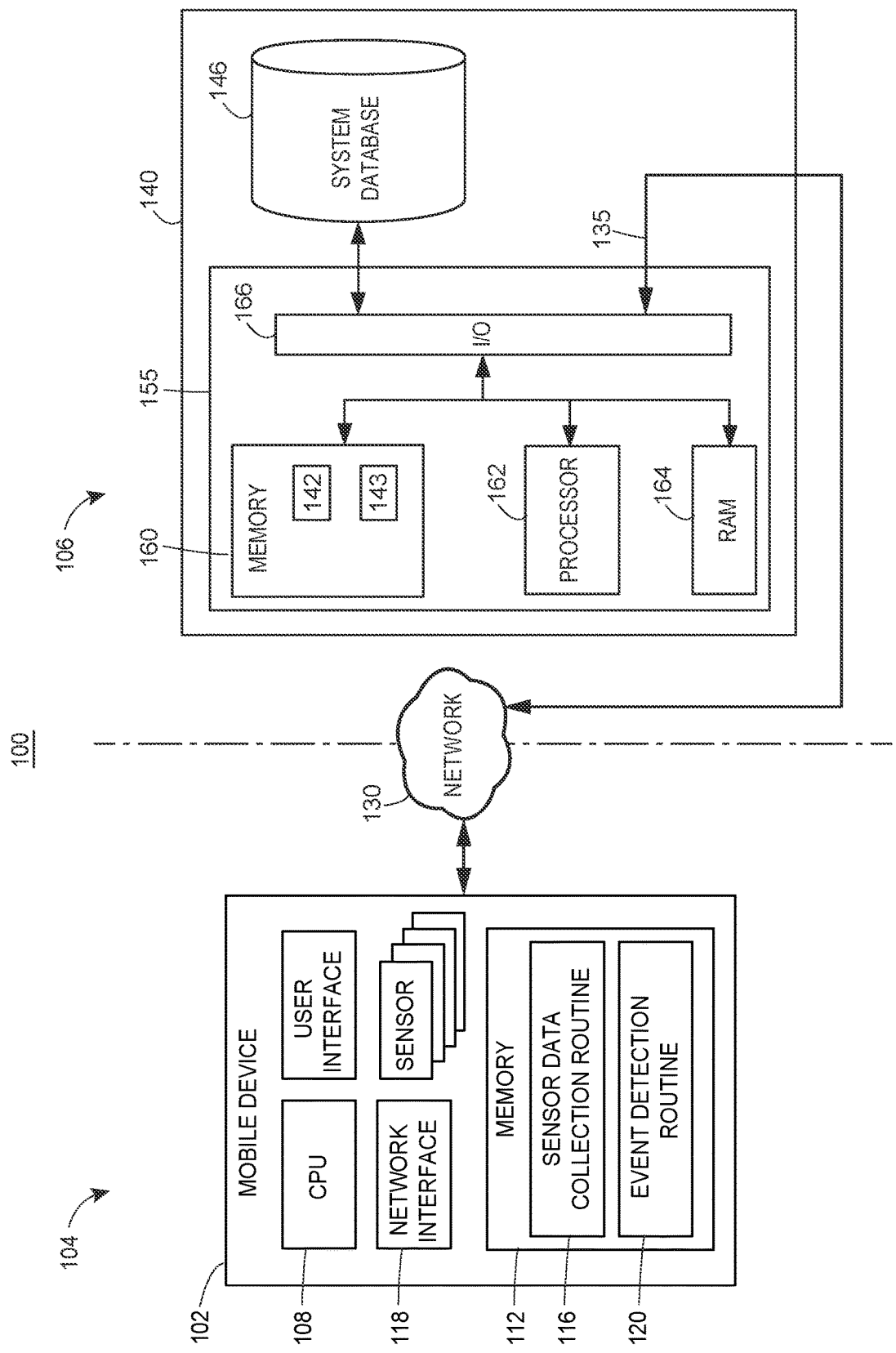
FIG. 1 illustrates an example system for identifying a primary vehicle associated with a user of a mobile device.

FIG. 1 illustrates an example system 100 for identifying a primary vehicle associated with a user of a mobile device 102. The high-level architecture includes both hardware and software applications, as well as various data communications channels for communicating data between the various hardware and software components. The system 100 may be roughly divided into front-end components 104 and back-end components 106. The front-end components 104 may be mobile components disposed in the vehicle (e.g. car, truck, boat, etc.) or with a user, and the back-end components 104 may be stationary components, in an embodiment.

The example front end components 104 include the mobile device 102. The mobile device 102 may be any suitable mobile computing and/or communication device, such as a smartphone or tablet computer. In an implementation, the mobile device 102 includes a CPU 108, a user interface 110 (including a touchscreen, keyboard, etc.), and a memory 112 (e.g., volatile memory, non-volatile memory, or a combination thereof). The example mobile device 102 also includes one or more sensors 114 configurable to collect data related to vehicle-user activities, such as entering a vehicle, exiting a vehicle, driving a vehicle, riding in a vehicle, etc. For example, the one or more sensors 114 may include accelerometers, compasses, barometers, ambient light sensors, gyroscopes, magnetometers, geographic positioning system (GPS) receivers, microphones, cameras, etc.

Further, the memory 112 may store a sensor data collection routine 116 to gather, manipulate, and/or communicate data from the sensors 114. For example, the sensor data collection routine 116 may utilize one or more application programming interfaces (APIs) to control and/or communicate with the sensors 114. In one implementation, the sensor data collection routine 116 may: (i) continuously, or at some pre-determined time steps, retrieve measurements (accelerations, orientations, angles, audio, etc.) from the sensors 114; (ii) optionally manipulate the measurements to generate sensor data in a convenient format (e.g., a timestamp-measurement time series); and (iii) communicate sensor data to other applications stored in the memory 114 or to requesting computing devices included in the back-end components 104 (e.g., via a network interface 118). Such data communication with back-end components will be further discussed with reference to FIG. 3.

The memory 112 may also store an event detection routine 120, in an implementation. The event detection routine 120 may utilize certain APIs, or specially developed algorithms, to detect vehicle-user events based on data from the sensors 114, in an implementation. For example, the event detection routine 120 may detect events such as a vehicle entry event when a user enters a vehicle (e.g., opens a door from outside the vehicle, steps into the vehicle, and sits in an operator's position within the vehicle) or a vehicle exit event when a user exits a vehicle (e.g., opens a door from inside the vehicle, steps out of the vehicle, and walks away from the vehicle). In some cases, the event detection routine 120 may communicate with the network interface 118 to transmit indications of vehicle-user events to one or more of the backend components 108.

Although FIG. 1 illustrates one sensor data collection routine 116 and one event detection routine 120, it is understood that the functionality of the routines 116 and 120 may be split or combined into any number of routines executed by the mobile device 102. Also, some or all of the functionality of the routines 116 and 120 may be implemented in an application executed in the back-end components 106, and, thus, the functionality and/or computation cost of execution of the routines 116 and 120 may be distributed in any suitable manner between the front-end components 104 and the back-end components 106.

The front-end components 104 communicate with the back-end components 106 via the network 130. The network 130 may be a proprietary network, a secure public internet, a virtual private network or some other type of network, such as dedicated access lines, plain ordinary telephone lines, satellite links, wireless links, cellular links, combinations of these, etc. Where the network 130 comprises the Internet, data communications may take place over the network 130 via an Internet communication protocol.

The back-end components 106 include a server 140 with one or more computer processors adapted and configured to execute various software applications and components for identifying a primary vehicle associated with a user of a mobile device 102, in addition to other software applications. The server 140 further includes a database 146. The database 146 is adapted to store data related to the operation of the system 100. Such data might include, for example, data collected by the front-end components 104 pertaining to vehicle-user activities (e.g., from the one or more sensors 114) and uploaded to the server 140. The server 140 may access data stored in the database 146 when executing various functions and tasks associated with identifying a primary vehicle associated with a user of a mobile device 102.

Although the system 100 is shown to include one server 140 and one mobile device 102, it should be understood that different numbers of servers and mobile devices may be utilized. In particular, the processing performed by the server 140 may be distributed among a plurality of servers in an arrangement known as "cloud computing," in an embodiment. This configuration may provide several advantages, such as, for example, enabling near real-time uploads and downloads of information as well as periodic uploads and downloads of information.

The server 140 may have a controller 155 that is operatively connected to the database 146 via a link 156. It should be noted that, while not shown, additional databases may be linked to the controller 155 in a known manner. The controller 155 may include a program memory 160, a processor 162 (may be called a microcontroller or a microprocessor), a random-access memory (RAM) 164, and an input/output (I/O) circuit 166, all of which may be interconnected via an address/data bus 165. The program memory 160 may be configured to store computer-readable instructions that when executed by the processor 162 cause the server 140 to implement a server application 142 and a web server 143. The instructions for the server application 142 may cause the server 140 to implement the methods described herein. While shown as a single block in FIG. 1, it will be appreciated that the server application 142 may include a number of different programs, modules, routines, and sub-routines that may collectively cause the server 140 to implement the server application 142. It should be appreciated that although only one microprocessor 162 is shown, the controller 155 may include multiple microprocessors 162. Similarly, the memory of the controller 155 may include multiple RAMs 164 and multiple program memories 160. Further, while the instructions for the server application 142 and web server 143 are shown being stored in the program memory 160, the instructions may additionally or alternatively be stored in the database 146 and/or RAM 164. Although the I/O circuit 166 is shown as a single block, it should be appreciated that the I/O circuit 166 may include a number of different types of I/O circuits. The RAM(s) 164 and program memories 160 may be implemented as semiconductor memories, magnetically readable memories, and/or optically readable memories, for example. The controller 155 may also be operatively connected to the network 130 via a link 135.

In some implementations, the server 140 may execute the server application 142 to identify a user's primary vehicle based on one or more trip logs stored in the system database 146. The trip logs may include data gathered from the sensors 114 at times between a vehicle entry event and a vehicle exit event, as described below with reference to FIGS. 2 and 3.

Figure 2:
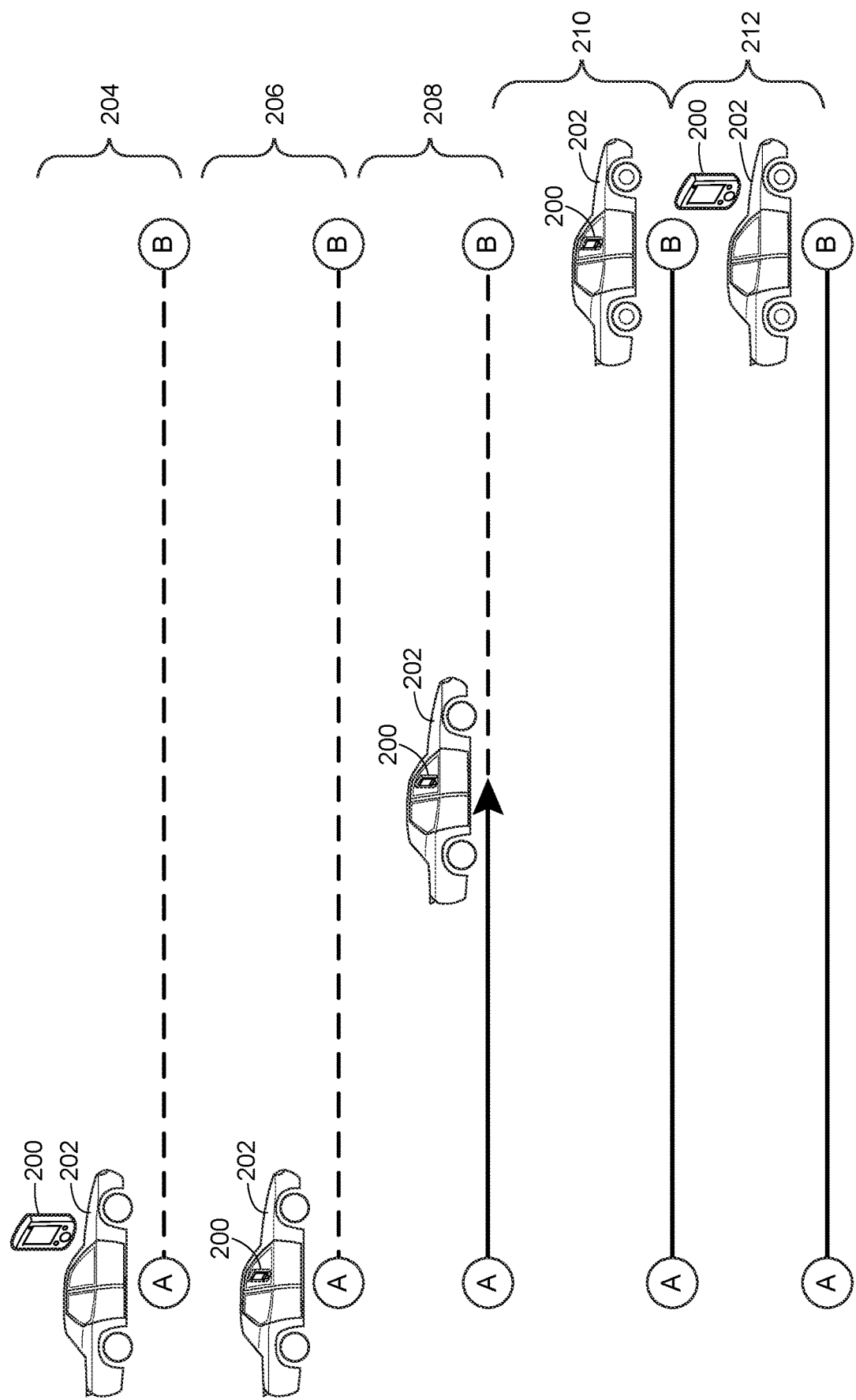
FIG. 2 illustrates an example scenario of a vehicle "trip" which can be logged using the system illustrated in FIG. 1.

FIG. 2 illustrates an example scenario in which a trip log is generated based on data gathered from sensors in a mobile device 200 while a vehicle 202 is driven from a point "A" to a point "B." For example, a user may travel with the mobile device 200, such as a smartphone, from home (point A) to a grocery store (point B) in a family car. The scenario may be split into a series of stages 204, 206, 208, 210, and 212, arranged in FIG. 2 temporally from stage 204, the first stage of a "trip," to later stages 206, 210, and 212. However, it is understood that a trip log may be generated based on any suitable stages of a "trip" in a vehicle or any other suitable organization of time and/or gathered data.

Initially, during the example stage 204, a user of the mobile device 200 is outside of the vehicle 202, and the mobile device may be with the user (e.g., in a purse or pocket). In an implementation, sensors, such as the sensors 114, inside of the mobile device 200, may continuously generate data about vehicle-user activities. For example, an accelerometer, in combination with a sensor data collection routine, may continuously generate a time series of time-stamp-acceleration data. An event detection routine, such as the event detection routine 120, may analyze such data continuously, periodically, or with some sampling rate so as to detect vehicle-user events or activities. Alternatively or additionally, such data (or sampled portions of such data) may be transmitted by the mobile device 200 to one or more servers for processing by back-end components (e.g., the server 140).

In stage 206 of the example scenario, a user enters the vehicle 202 (e.g., through a door) to operate the vehicle 202. In doing so, the user transfers the mobile device 200 from the outside of the vehicle 202 to the inside of the vehicle 202, and data indicative of the transfer event (i.e., the vehicle entry event) is gathered by sensors in the mobile device 200. For example, a microphone sensor in the mobile device 200 may gather audio indicative of a door closing, an engine of the vehicle 202 starting, etc., or an accelerometer sensor in the mobile device 200 may gather acceleration data indicative of a user stepping into the vehicle 202, sitting down in an operator's position within the vehicle 202, etc. Based on such gathered data, an event detection routine, such as the event detection routine 120, in the mobile device 200 or an application executing on a server may detect the vehicle entry event. In the case that an event detection routine on the mobile device detects the vehicle entry event, the mobile device 200 may send an indication of the vehicle entry event to a back-end component, such as the server 140. For example, an indication of the vehicle entry event may include, in an implementation, at least a timestamp corresponding to the vehicle entry event and a mobile device or user identifier (phone number, insurance policy number, media access control (MAC) address, application identification number, etc.). The indication of the vehicle entry event may also include a geographic location, portions of the sensor data used to determine the vehicle entry event, etc.

After the vehicle entry event, the user may operate the vehicle 202 so as to travel in the vehicle 202 from point A to point B (stage 208). While the vehicle 202 is traveling, the mobile device 200 in the vehicle 202 may generate further sensor data related to operation of the vehicle 202. For example, a GPS receiver in the mobile device 200 may generate time-dependent geographic location data indicative of the physical path the vehicle 202 travels between point A and point B. Also, accelerometers, gyroscopes, etc. may generate motion data indicative of a vehicle operator's driving behavior (e.g., severity of acceleration and braking), and microphone or camera sensors may generate data indicative of distracted driving. In some implementations, some or all of this data collected after the vehicle entry event and before reaching a destination (point B) is sent, via a network interface on the mobile device 200, to one or more back-end components (e.g., server 140).

Once the vehicle 202 reaches the destination (point B), the vehicle 202 may come to a stop while the user and the mobile device 200 remain inside the vehicle (stage 210). For example, a user travelling to a grocery store from home may eventually come to a stop in a parking lot of the grocery store. Then in stage 212, the user may exit the vehicle 202 along with the mobile device 200 (e.g., in a pocket or purse). In doing so, the user transfers the mobile device 200 from the inside of the vehicle 202 to outside the vehicle 202, and data indicative of the transfer event (i.e., the vehicle exit event) is gathered by sensors in the mobile device 200. For example, a microphone sensor in the mobile device 200 may gather audio indicative of a door opening, an engine of the vehicle 202 stopping, etc., or an accelerometer sensor in the mobile device 200 may gather acceleration data indicative of a user stepping out of the vehicle 202, standing up, walking away from the vehicle 202, etc. Based on such gathered data, an event detection routine, such as the event detection routine 120, in the mobile device 200 or an application executing on a server may detect the vehicle exit event. As with the vehicle entry event, the mobile device 200 may send an indication of the vehicle exit event to a back-end component, such as the server 140.

In some implementations, back-end components, such as the server 140, may capture indications of vehicle entry/exit events and data gathered during a trip from one point to another in a trip log. The server 140 may then store such a trip log (e.g., as a data file or entry) in a database, such as the database 146. Thus, the server may communicate with a mobile device and database to record trip logs corresponding to trips made by a user of the mobile device in one or more vehicles, as will be further discussed with reference to FIG. 3.

Although, FIG. 2 illustrates a single trip between two points, it is understood that a mobile device and/or server may collect and record data about any number of user trips (in a vehicle) between any number of points with any number of vehicle entry/exit events. For example, a mobile device may collect data, which is subsequently sent to one or more back-end components, about a trip from a home location to a grocery store with an intermediate stop at a gas station. Such a trip may include three points at which the vehicle stops and four vehicle entry/exit events. Further, a user may travel from home to a grocery store multiple times in a day, week, month, etc. and to/from multiple other locations (work, relative's house, the beach, etc.). All or multiple of such trips may be recorded in trip logs to identify a user's primary vehicle, in an implementation.

Figure 3:
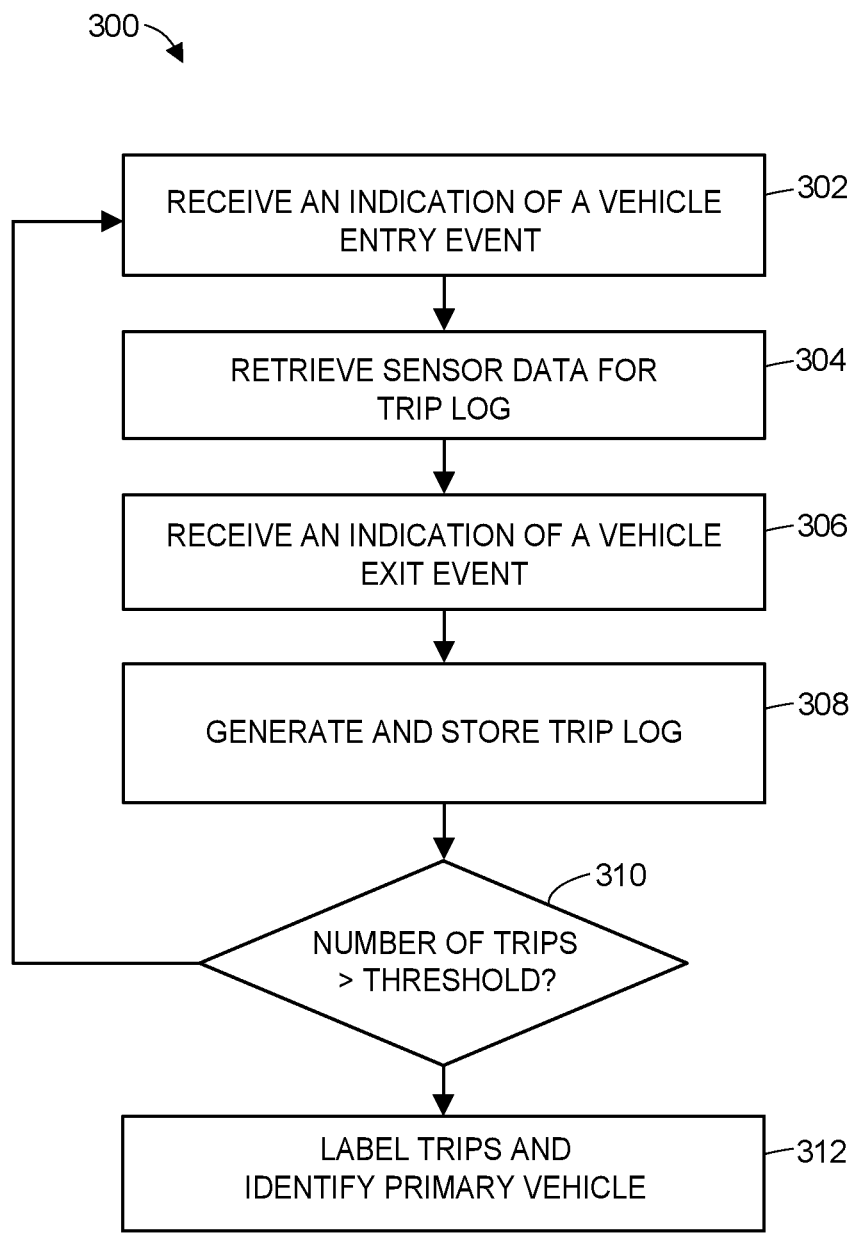
FIG. 3 is a flow diagram of an example method for identifying a primary vehicle associated with a user of a mobile device which can be implemented by the system illustrated in FIG. 1.

FIG. 3 is a flow diagram of an example method 300 for identifying a primary vehicle corresponding to a user of a mobile device, such as one of the mobile devices 102 or 200. The method 300 may be implemented by the server 140, for example.

To begin, an indication of a vehicle entry event is received from a mobile device (block 302), such as mobile device 102. In some implementations, the mobile device 102 may continuously, or at a pre-defined sampling rate, gather data generated by the sensors 114 in the mobile device 102. For example, a user may "install" an application (e.g., including sensor data collection routine 116) on the mobile device 102, where, during execution, the application continuously feeds sensor data from the sensors 114 to the event detection routine 120. This retrieved data may be processed by the event detection routine 120 on the mobile device in real-time or by the server application 142 in batch processing.

The event detection routine 120 may include a supervised learning algorithm to identify the vehicle entry event, in an implementation. The learning algorithm, such as a classification learning algorithm, may be executed based on any suitable portion of the retrieved data, such as a window or moving window of the retrieved sensor data. By way of example, the algorithm used to identify vehicle entry/exit events may include components such as calibration, feature extraction, activity classification, decision tree classifier, similarity detector, smoothing, etc. components.

Once a vehicle entry event is detected, the mobile device 102 (or server executed application) may generate an indication of the vehicle entry event and send the indication to the server 140, where it is subsequently received at the server 140. The indication of the vehicle entry event, received by the server 140, may include a timestamp indicating a time at which the user entered a vehicle, a geographic location at which the user entered the vehicle, portions of data (e.g., acceleration or audio data) used to determine the vehicle entry event, an identification of the mobile device, etc.

The server 140 may receive the indication of the vehicle entry event via any appropriate protocol over the network 130. For example, an installed application on the mobile device 102 (e.g., retrieved from the web server 143 or other online application store) may communicate the indication to the server 140 via Hypertext Transfer Protocol (HTTP) messages. It is clear, though, that the indication may be communicated via any suitable protocol which may include proprietary or specially configured protocols corresponding to certain companies or applications.

Next, sensor data is retrieved from the mobile device 102, where the retrieved sensor data is indicative of vehicle operation during a "trip" (block 304). As illustrated in FIG. 2, a "trip" may include travel in a vehicle, such as the vehicle 202, between two or more points. During such travel, the server 140 may retrieve sensor data from the mobile device 102, such as geographic coordinates (e.g., from a GPS receiver sensor), acceleration data (e.g., from an accelerometer), etc. The server 140 may associate the retrieved sensor data with a trip corresponding to the mobile device 102 and may capture such data in trip log, as discussed below with reference to block 308.

After collecting sensor data indicative of vehicle operation during a trip, an indication of a vehicle exit event is received from the mobile device 102 (block 306). As with the vehicle entry event, the mobile device 102 may detect a vehicle exit event based on gathered sensor data and communicate an indication of the vehicle exit event to the back-end components 106, where it is subsequently received by the server 140. The indication of the vehicle exit event may include similar types of information as the indication of the vehicle entry event (geographic location of the event, timestamp, etc.). It is clear, though, that the indications of vehicle entry and exit may include differing types of information and may even be communicated via different formats or protocols.

The server 140 may then generate and store a trip log indicative of travel between the geographic location of the vehicle entry event and the geographic location of the exit event (block 308). By way of example, the trip log may include: (i) sensor data (such as GPS receiver, accelerometer, microphone, etc. data) retrieved from the mobile device 102 at times between the time of the vehicle entry vehicle and the vehicle exit event; (ii) a physical path (e.g., indicated by a geo-referenced polyline) taken by a vehicle between the starting point (e.g., a point "A") and a destination (e.g., a point "B"); (iii) an identification of the mobile device (phone number, username, media access control (MAC) address, internet protocol (IP) address, installed application registration number, insurance policy number, etc.); and (iv) detected patterns of vehicle behavior (e.g., acceleration patterns).

The server 140 may store the trip log in a database, such as the database 146, according to any suitable data structure, scheme, or data interface. For example, the server 140 may store the trip log in the database 146 according to a known relational database management system (RDBMS), distributed framework (e.g., Apache™ Hadoop), or a document-oriented database system (e.g., NoSQL). The server 140 may query the database 146, according to a corresponding query language or format, for trip logs associated the mobile device 102, or any other mobile device for which the database 146 stores trip logs.

Next, it is determined if a number of trip logs in the database 146 corresponding to a mobile device, such as the mobile device 102, is greater than a threshold value (block 310). This threshold value may, in some implementations, correspond to a minimum number of trip logs needed to consistently identify a user's primary vehicle with some measure of accuracy (e.g., 85-90% accurate). If the number of trip logs is not greater than the threshold, the flow reverts to block 302 where another trip may be detected and subsequently logged. However, if the number of trip logs is greater than the threshold, the flow continues to block 312.

A learning algorithm (e.g., part of the server application 142) is then executed on all or some of the trip logs stored in the database 146 to label trips and identify a primary vehicle corresponding to the user of the mobile device 102 (block 312). In some implementations, the learning algorithm may be part of the server application 142 and may include any suitable unsupervised clustering algorithms, such as a k-means, hierarchical, or distribution/density-based clustering algorithms. The learning algorithm may cluster groups of trip logs into groups including a "primary vehicle" group and one or more "other vehicle" groups. To this end, the learning algorithm may process the sensor data in each of the trip logs corresponding to the mobile device 102 to identify, for example, similar routes between destinations, acceleration/braking patterns, engine sounds, vehicle entry/exit characteristics, etc.

Further, in some implementations, multiple different groups of trip log and/or individual trip logs may be uniquely labeled or ranked according to the learning algorithm. For example, groups of trip logs may be labeled as "primary vehicle," "secondary vehicle," "tertiary vehicle," etc. The learning algorithm may cluster the trip logs into any suitable number of groups or labels dynamically or based on pre-determined or programmed parameters. For example, the server application 142 may be programmed to only identify two groups, a "primary vehicle" group and an "other vehicle" group. Alternatively, the server application may execute a learning algorithm on the trip logs which automatically determines an appropriate number of groups, or corresponding vehicles, into which the trip logs may be clustered.

In one scenario, a user may drive a primary vehicle to only a small number of destinations (home, work, grocery store, gas station, etc.) a majority of the time the vehicle is operated. Whereas, the user may drive other vehicles (vehicles owned by friends, rental cars, etc.) to more random destination. Moreover, a primary vehicle may simply have many more corresponding trip logs stored in the database 146 as compared to other vehicles. As such, the server 140 may execute an unsupervised learning algorithm to identify a "primary vehicle" within a set of trip logs based on such patterns.

Although identifying a primary vehicle based on a single "variable" or characteristic (e.g., similar driving routes or number of stored trip logs) may be sufficient in some cases, a learning algorithm utilized as part of the server application 142 may identify a primary vehicle using a multivariate approach. For example, a learning algorithm may identify primary and other vehicles based on multiple types of data (acceleration patterns, driving routes, audio signals, etc.), where the multiple types of data may be combined or utilized in any appropriate way (e.g., using assigned weights). Such combinations of dissimilar data types may be learned based on reference data or may be programmed as part of the server application 142.

In addition to identifying a primary vehicle, the server 140 may execute the server application 142 to determine other user or vehicle information based on trip logs. For example, the server 140 may execute the server application 142 to determine: (i) where the mobile device 102 is on the user (purse, pocket, in hand, backpack, etc.); (ii) if the user is in a driver or passenger seat in a vehicle; (iii) the type of vehicle (truck, sport utility vehicle, van, etc.) in which the user is located; and (iv) if the user is driving or riding in the vehicle.

Thus, the method 300 discussed above allows a primary vehicle of a user to be automatically detected. As such, an insurance company, for example, may utilize the method 300 to more accurately and efficiently rate each driver associated with a household, because a primary, secondary, etc. vehicle for each driver of the household may be easily identified. Further, any sensor data collected by the mobile device for other purposes may be tied directly to both a certain member of a household and a certain vehicle (e.g., labeled and/or stored as data corresponding to the certain vehicle). For example, a server may combine sensor data from a mobile device with a primary, secondary, etc. vehicle identification to determine an amount of risk associated with a certain user driving certain vehicles.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention. By way of example, and not limitation, the present disclosure contemplates at least the following aspects:

1. A computer-implemented method comprising: receiving, via a network interface, an indication of a vehicle entry event from a mobile device, wherein the vehicle entry event corresponds to a user of the mobile device entering a vehicle at a first point in time;
retrieving, with one or more computer processors and the network interface, sensor data from the mobile device; receiving, via the network interface, an indication of a vehicle exit event from the mobile device, wherein the vehicle exit event corresponds to the user exiting the vehicle at a second point in time; generating, with the one or more computer processors, a trip log including portions of the sensor data generated by the mobile device at times between the first point in time and the second point in time; storing, with the one or more computer processors, the trip log in a trip database; and analyzing, with the one or more computer processors, the trip log and a plurality of previously stored trip logs in the trip database to determine a primary vehicle corresponding to the user of the mobile device.

2. The computer-implemented method according to aspect 1, further comprising receiving a geographic location of the vehicle entry event and the vehicle exit event in the indication of the vehicle entry event and the indication of the vehicle exit event, respectively.

3. The computer-implemented method according to either aspect 1 or aspect 2, further comprising receiving the indication of the vehicle entry event and the indication of the vehicle exit event based on an execution of a supervised classification algorithm on the mobile device.

4. The computer-implemented method according to any one of the preceding aspects, further comprising continuously retrieving the sensor data from the mobile device.

5. The computer-implemented method according to any one of the preceding aspects, further comprising retrieving sensor data that includes data from a geographic positioning system (GPS) receiver.

6. The computer-implemented method according to any one of the preceding aspects, further comprising retrieving sensor data sensor data that includes at least one of accelerometer data, gyroscope data, microphone data, video data, barometer data, compass data, ambient light data, proximity data, and magnetometer data.

7. The computer-implemented method according to any one of the preceding aspects, further comprising capturing in the trip log a vehicle operation route between an originating point and a destination point.

8. The computer-implemented method according to any one of the preceding aspects, further comprising capturing in the trip log the originating point based on the indication of the vehicle entry event and the destination point based on the indication of the vehicle exit event.

9. The computer-implemented method according to any one of the preceding aspects, wherein analyzing the trip log and a plurality of previously stored trip logs in the trip database includes: (i) detecting clusters of trip logs, wherein each trip log in the cluster of trip logs shares a similarity, and (ii) labeling each of the clusters of trip logs as corresponding to at least the primary vehicle and another vehicle.

10. The computer-implemented method according to any one of the preceding aspects, wherein the similarity is related to at least one of vehicle operation routes or vehicle operation patterns.

11. The computer-implemented method according to any one of the preceding aspects, wherein detecting clusters of trip logs includes executing an unsupervised clustering algorithm.

12. The computer-implemented method according to any one of the preceding aspects, wherein labeling each of the clusters of trip logs includes: (i) labeling a primary cluster of trip logs as corresponding to the primary vehicle, and (ii) labeling a secondary cluster of trip logs as corresponding to a secondary vehicle.

13. The computer-implemented method according to any one of the preceding aspects, wherein labeling each of the clusters of trip logs further includes labeling a tertiary cluster of trip logs as corresponding to a tertiary vehicle.

14. The computer-implemented method according to any one of the preceding aspects, further comprising determining, with the one or more computer processors, if a number of the plurality of previously stored trip logs exceeds a threshold number.

15. The computer-implemented method according to any one of the preceding aspects, wherein the analyzing the trip log and a plurality of previously stored trip logs is dependent on determining if the number of the plurality of previously stored trip logs exceeds the threshold number.

16. The computer-implemented method according to any one of the preceding aspects, further comprising: (i) retrieving, with the one or more processors, subsequent sensor data from the mobile device; and (ii) labeling, with the one or more processors, the subsequent sensor data from the mobile device as data corresponding to the primary vehicle.

17. A computer device comprising: one or more processors; and one or more memories coupled to the one or more processors; wherein the one or more memories include computer executable instructions stored therein that, when executed by the one or more processors, cause the one or more processors to: (i) receive, via a network interface, an indication of a vehicle entry event from a mobile device, wherein the vehicle entry event corresponds to a user of the mobile device entering a vehicle at a first point in time, (ii) retrieve, with the network interface, sensor data from the mobile device, (iii) receive, via the network interface, an indication of a vehicle exit event from the mobile device, wherein the vehicle exit event corresponds to the user exiting the vehicle at a second point in time, (iv) generate a trip log including portions of the sensor data generated by the mobile device at times between the first point in time and the second point in time, (v) store the trip log in a trip database, and (vi) analyze the trip log and a plurality of previously stored trip logs in the trip database to determine a primary vehicle corresponding to the user of the mobile device.

18. The computer device of aspect 17, wherein the indication of the vehicle entry event and the indication of the vehicle exit event are generated based on an execution of a supervised classification algorithm on the mobile device.

19. The computer device of either aspect 17 or aspect 18, wherein the sensor data includes data from a geographic positioning system (GPS) receiver.

20. The computer device according to any one of aspects 17 to 19, wherein the sensor data further includes at least one of accelerometer data, gyroscope data, microphone data, video data, barometer data, compass data, ambient light data, proximity data, and magnetometer data.

21. The computer device according to any one of aspects 17 to 20, wherein analyzing the trip log and a plurality of previously stored trip logs in the trip database includes: (i) detecting clusters of trip logs, wherein each trip log in the cluster of trip logs shares a similarity, and (ii) labeling each of the clusters of trip logs as corresponding to at least the primary vehicle and another vehicle.

22. The computer device according to any one of aspects 17 to 21, wherein the similarity is related to at least one of vehicle operation routes or vehicle operation patterns.

23. A computer readable storage medium comprising non-transitory computer readable instructions stored thereon, the instructions, when executed on one or more processors, cause the one or more processors to: receive, via a network interface, an indication of a vehicle entry event from a mobile device, wherein the vehicle entry event corresponds to a user of the mobile device entering a vehicle at a first point in time, retrieve, with the network interface, sensor data from the mobile device, receive, via the network interface, an indication of a vehicle exit event from the mobile device, wherein the vehicle exit event corresponds to the user exiting the vehicle at a second point in time, generate a trip log including portions of the sensor data generated by the mobile device at times between the first point in time and the second point in time, store the trip log in a trip database, and analyze the trip log and a plurality of previously stored trip logs in the trip database to determine a primary vehicle corresponding to the user of the mobile device.

The invention claimed is:

1. A computer-implemented method for verifying the use of a primary vehicle associated with a user's insurance policy, comprising:
   generating sensor data by one or more sensors of a mobile computing device temporarily disposed inside an initially unidentified vehicle at times between a first point in time corresponding to a vehicle entry event and a second point in time corresponding to a vehicle exit event;
   receiving, by one or more computer processors, the sensor data generated by the one or more sensors of the mobile computing device temporarily disposed within the initially unidentified vehicle;
   generating, with the one or more computer processors, a trip log associated with the mobile computing device, the trip log including portions of the sensor data generated by the sensors of the mobile computing device temporarily disposed inside the initially unidentified vehicle at times between the first point in time and the second point in time;
   storing, with the one or more computer processors, the trip log associated with the mobile computing device in a trip database;
   when a number of previously stored trip logs associated with the mobile computing device exceeds a threshold number, triggering, with the one or more computer processors, an execution of a multivariate analysis of the sensor data of the trip log associated with the mobile computing device and the sensor data of previously stored trip logs associated with the mobile computing device in the trip database; and
   identifying the initially unidentified vehicle associated with the trip log, with the one or more computer processors, based on the multivariate analysis of the sensor data of the trip log associated with the mobile computing device and the sensor data of previously stored trip logs associated with the mobile computing device in the trip database.

2. The computer-implemented method of claim 1, further comprising:
   receiving a geographic location associated with the vehicle entry event and the vehicle exit event, respectively.

3. The computer-implemented method of claim 1, further comprising:
   receiving an indication of the vehicle entry event and an indication of the vehicle exit event based on an execution of a supervised classification algorithm on the generated sensor data from the mobile computing device.

4. The computer-implemented method of claim 1, further comprising:
   continuously retrieving the sensor data from the mobile computing device.

5. The computer-implemented method of claim 1, further comprising:
   retrieving sensor data that includes data from a geographic positioning system (GPS) receiver that is integrated with the mobile computing device.

6. The computer-implemented method of claim 1, wherein the sensor data from the mobile computing device includes at least one of accelerometer data, gyroscope data, microphone data, video data, barometer data, compass data, ambient light data, proximity data, and magnetometer data.

7. The computer-implemented method of claim 2, further comprising:
   capturing in the trip log an originating point having the geographic location associated with the vehicle entry event and a destination point having the geographic location associated with the vehicle exit event.

8. The computer-implemented method of claim 1, further comprising using a learning algorithm to cluster the trip log and the previously stored trip logs associated with the mobile computing device into a primary vehicle trip log group or one or more other vehicle trip log groups.

9. The computer-implemented method of claim 1, further comprising:
   retrieving, with the one or more processors, subsequent sensor data from the mobile computing device; and
   labeling, with the one or more processors, the subsequent sensor data from the mobile computing device as data corresponding to the first vehicle,
   wherein the label indicates the identity of the first vehicle.

10. The computer-implemented method of claim 1, wherein the sensor data from the mobile computing device includes data indicating engine sounds of the vehicle that is generated via a microphone associated with the mobile computing device.

11. The computer-implemented method of claim 1, wherein the multivariate analysis is performed on the sensor data in a weighted manner.

12. A computer device to verify the use of a primary vehicle associated with a user's insurance policy, comprising:
   one or more processors; and
   one or more memories coupled to the one or more processors;
   wherein the one or more memories include computer executable instructions stored therein that, when executed by the one or more processors, cause the one or more processors to:
   receive sensor data generated by one or more sensors of a mobile computing device temporarily disposed inside an initially unidentified vehicle at times between a first point in time corresponding to a vehicle entry event and a second point in time corresponding to a vehicle exit event;
   generate a trip log associated with the mobile computing device, the trip log including portions of the sensor data generated by the sensors of the mobile computing device temporarily disposed inside the initially unidentified vehicle at times between the first point in time and the second point in time;
   store the trip log associated with the mobile computing device in a trip database;
   when a number of previously stored trip logs associated with the mobile computing device exceeds a threshold number, trigger an execution of a multivariate analysis of the sensor data of the trip log associated with the mobile computing device and the sensor data of previously stored trip logs associated with the mobile computing device in the trip database, and identify the initially unidentified vehicle, based on the multivariate analysis of the sensor data of the trip log associated with the mobile computing device and the sensor data of previously stored trip logs in the trip database associated with the mobile computing device.

13. The computer device of claim 12, wherein an indication of the vehicle entry event and an indication of the vehicle exit event are generated based on an execution of a supervised classification algorithm on the generated sensor data from the mobile computing device.

14. The computer device of claim 12, wherein the sensor data includes data from a geographic positioning system (GPS) receiver that is integrated with the mobile computing device.

15. The computer device of claim 12, wherein the sensor data from the mobile computing device includes at least one of accelerometer data, gyroscope data, microphone data, video data, barometer data, compass data, ambient light data, proximity data, and magnetometer data.

16. The computer device of claim 12, the sensor data from the mobile computing device includes data indicating engine sounds of the vehicle that is generated via a microphone associated with the mobile computing device.

17. The computer device of claim 12, wherein the one or more processors are further configured to perform the multivariate analysis on the sensor data in a weighted manner.

18. A non-transitory computer readable storage medium storing non-transitory computer readable instructions stored thereon for verification of the use of a primary vehicle associated with a user's insurance policy, the instructions, when executed on one or more processors, cause the one or more processors to:
receive sensor data generated by one or more sensors of a mobile computing device temporarily disposed inside an initially unidentified vehicle at times between a first point in time corresponding to a vehicle entry event and a second point in time corresponding to a vehicle exit event;
generate a trip log associated with the mobile computing device, the trip log including portions of the sensor data generated by the sensors of the mobile computing device temporarily disposed inside the initially unidentified vehicle at times between the first point in time and the second point in time corresponding to a vehicle exit event, store the trip log associated with the mobile computing device in a trip database;
when a number of previously stored trip logs associated with the mobile computing device exceeds a threshold number, trigger an execution of a multivariate analysis of the sensor data of the trip log associated with the mobile computing device and the sensor data of previously stored trip logs associated with the mobile computing device in the trip; and
identify the initially unidentified vehicle, based on the multivariate analysis of the sensor data of the trip log associated with the mobile computing device and the sensor data of previously stored trip logs in the trip database associated with the mobile computing device.

19. The non-transitory computer readable storage medium of claim 18, wherein the sensor data from the mobile computing device includes data indicating engine sounds of the vehicle that is generated via a microphone associated with the mobile computing device.

20. The non-transitory computer readable storage medium of claim 18, wherein the instructions, when executed on the one or more processors, cause the one or more processors to perform the multivariate analysis on the sensor data in a weighted manner.

* * * * *